(12) United States Patent
Mariella et al.

(10) Patent No.: US 12,363,024 B2
(45) Date of Patent: Jul. 15, 2025

(54) SWITCHING OPTIMIZATION

(71) Applicant: MASTERCARD INTERNATIONAL INCORPORATED, Purchase, NY (US)

(72) Inventors: Nicola Mariella, Oranmore (IE); Stephen Patrick Flinter, Terenure (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 214 days.

(21) Appl. No.: 18/265,954

(22) PCT Filed: Dec. 8, 2021

(86) PCT No.: PCT/US2021/062398
§ 371 (c)(1),
(2) Date: Jun. 7, 2023

(87) PCT Pub. No.: WO2022/125658
PCT Pub. Date: Jun. 16, 2022

(65) Prior Publication Data
US 2024/0039830 A1      Feb. 1, 2024

(30) Foreign Application Priority Data

Dec. 9, 2020   (GB) .................................... 2019373

(51) Int. Cl.
*H04L 45/12* (2022.01)
*G06N 10/60* (2022.01)

(52) U.S. Cl.
CPC .............. *H04L 45/12* (2013.01); *G06N 10/60* (2022.01)

(58) Field of Classification Search
CPC ....... H04L 45/12; H04L 45/306; H04L 45/60; G06N 10/60; G06N 5/01; G06Q 20/027
(Continued)

(56) References Cited

U.S. PATENT DOCUMENTS 10,817,337 B1 * 10/2020 Richardson ........... G06F 9/5005
2010/0030687 A1    2/2010 Panthaki et al.
(Continued)

FOREIGN PATENT DOCUMENTS

WO    WO2020/037300    2/2020

*Primary Examiner* — Adil Ocak
(74) *Attorney, Agent, or Firm* — Harness, Dickey & Pierce, P.L.C.

(57) ABSTRACT

A system and computer-implemented method for allocating a plurality of transactions to a plurality of networks comprising: receiving from a router at a classical computer a plurality of first information associated with a respective one of the plurality of transactions; receiving from a router at the classical computer a plurality of second information associated with a respective one of the plurality of networks; determining in the classical computer a switching characteristic to be optimised by the allocation of the plurality of transactions to the plurality of networks; expressing by the classical computer in at least one expression to a quantum computer, the plurality of first information, the plurality of second information and the switching characteristic; resolving in the quantum computer the at least one expression to determine the allocation of the plurality of transactions to the plurality of networks; and providing the allocation to the router.

19 Claims, 5 Drawing Sheets

(58) Field of Classification Search
USPC .......................................................... 709/238
See application file for complete search history.

(56) References Cited

U.S. PATENT DOCUMENTS

| | | |
|---|---|---|
| 2016/0338075 A1 | 11/2016 | McKibben |
| 2017/0018013 A1 | 1/2017 | Faust et al. |
| 2018/0307988 A1 | 10/2018 | Fano et al. |
| 2020/0128063 A1 | 2/2020 | Griffin et al. |

* cited by examiner

SWITCHING OPTIMIZATION

CROSS-REFERENCE TO RELATED APPLICATIONS APPLICATION

This application is a U.S. National Stage of International Application No. PCT/US2021/062398, filed on Dec. 8, 2021, which claims the benefit of, and priority to, United Kingdom Patent Application No. 2019373.6, which was filed on Dec. 9, 2020. The entire disclosure of each of the above applications is hereby incorporated by reference for all purposes.

TECHNICAL FIELD

The present disclosure relates to quantum computing. In particular, the present disclosure relates to a computer-implemented method and corresponding computing device for optimising a network usage.

BACKGROUND

Quantum computers exploit the quantum super positioning characteristics of particles to determine the optimal solution to complex non-linear problems. Unlike classical computers where a classical memory bit will take either a value of "1" or a value of "0"; in a quantum computer, a quantum bit or "qubit" may take a value of "1", "0" or a super position of "1" and "0". By resolving the value of a plurality of qubits, the quantum computer can determine the minimum energy state of the qubits and so determine in one computation cycle the optimum solution to a given problem.

In order to exploit the processing efficiency of a quantum computer to solve a complex real world problem, the real world problem and variable may need to be expressed to the quantum computer in a resolvable manner. Determining how to express the problem and variables may be a computationally expensive task which may require more processing cycles than would be needed to solve the problem using a traditional iterative method.

The present disclosure has been devised to mitigate or overcome at least some of the above-mentioned problems.

SUMMARY OF THE DISCLOSURE

According to a first aspect there is provided a computer-implemented method for allocating a plurality of transactions to a plurality of networks comprising: receiving from a router at a classical computer a plurality of first information associated with a respective one of the plurality of transactions; receiving from a router at the classical computer a plurality of second information associated with a respective one of the plurality of networks; determining in the classical computer a switching characteristic to be optimised by the allocation of the plurality of transactions to the plurality of networks; expressing by the classical computer in at least one expression to a quantum computer, the plurality of first information, the plurality of second information and the switching characteristic; resolving in the quantum computer the at least one expression to determine the allocation of the plurality of transactions to the plurality of networks; and providing the allocation to the router.

The expressing at least one expression by the classical computer may comprise: extracting a first plurality of variables from the plurality of first information and a second plurality variables from the plurality of second information; determining a base expression with the first and second plurality of variables; determining a conditional expression from the first and second plurality of variables.

The method may further comprise combining the base expression and the conditional expression.

The determination of the base expression may further use a least one network constraint parameter.

The determination of the conditional expression may further use at least one network constraint parameter.

The determination of the conditional expression may use further conditional information The base expression may be a base cost expression The conditional expression may be a conditional discount expression.

The expressions may be determined to minimise one of a transaction cost; a transaction latency or a network loading.

There is provided according to a second aspect a computer-implemented method, performed by a classical computer for allocating a plurality of transactions to a plurality of networks comprising: receiving from a router a plurality of first information associated with a respective one of the plurality of transactions; receiving from a router a plurality of second information associated with a respective one of the plurality of networks; determining a switching characteristic to be optimised by the allocation of the plurality of transactions to the plurality of networks; expressing in at least one expression to a quantum computer, the plurality of first information, the plurality of second information and the switching characteristic; providing to a quantum computer the at least one expression to be resolved to determine the allocation of the plurality of transactions to the plurality of networks; receiving from the quantum computer the allocation; and providing the allocation to the router.

There is provided according to third aspect a system for allocating a plurality of transactions to a plurality of networks comprising: a classical computer configured to: receive a plurality of first information associated with a respective one of the plurality of transactions; receive a plurality of second information associated with a respective one of the plurality of networks; determine a switching characteristic to be optimised by the allocation of the plurality of transactions to the plurality of networks; and express at least one expression to a quantum computer, the plurality of first information, the plurality of second information and the switching characteristic; and a quantum computer configured to: resolve the at least one expression to determine the allocation of the plurality of transactions to the plurality of networks; the system being further configured to: provide the allocation of the transactions to a router.

There is provided according to a fourth aspect a switching optimization computer implemented method comprising the steps: (a) determining, by a classical computer, a non-convex sub-problem and a convex sub-problem of a constrained optimization problem, the constrained optimization problem comprising: a binary variable indicative of a discount being activated for a respective network; and a continuous variable representative of a first portion of a first volume of transactions to be switched to a first network, and a second portion of the first volume of transactions of to be switched to a second network; (e) solving, by a quantum computer, the non-convex sub-problem, thereby generating a binary solution; wherein the continuous variable is fixed for the step of solving the non-convex sub-problem; (f) solving, by a quantum computer, the convex sub-problem, thereby generating a continuous solution; wherein the convex sub-problem is solved using the binary solution, said binary solution being fixed; (k) repeating steps (e) and (f), using the continuous solution as the continuous variable, until a threshold is met; and (l) mapping the binary solution and the continuous solution to the constrained optimization problem, thereby providing an optimized switching.

The non-convex sub-problem may be a quadratic unconstrained binary optimization (QUBO) sub-problem.

The constrained optimization problem may be solved according to an alternating direction method of multipliers (ADMM) method.

The continuous solution may be determined according to a sequential convex programming method.

Determining the constrained optimization problem may be based on a set of switching details, wherein the constrained optimization problem comprises a plurality of constraints.

The plurality of constraints may comprise a discount amount constraint; a discount volume constraint; a transaction allocation constraint; and a binary constraint.

The threshold may be an iteration threshold.

The threshold may be a solution plateau threshold.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the disclosure will now be described, by way of example only, with reference to the accompanying drawings, in which.

DETAILED DESCRIPTION

The present disclosure relates to a computer-implemented method for optimizing.

Figure 1:
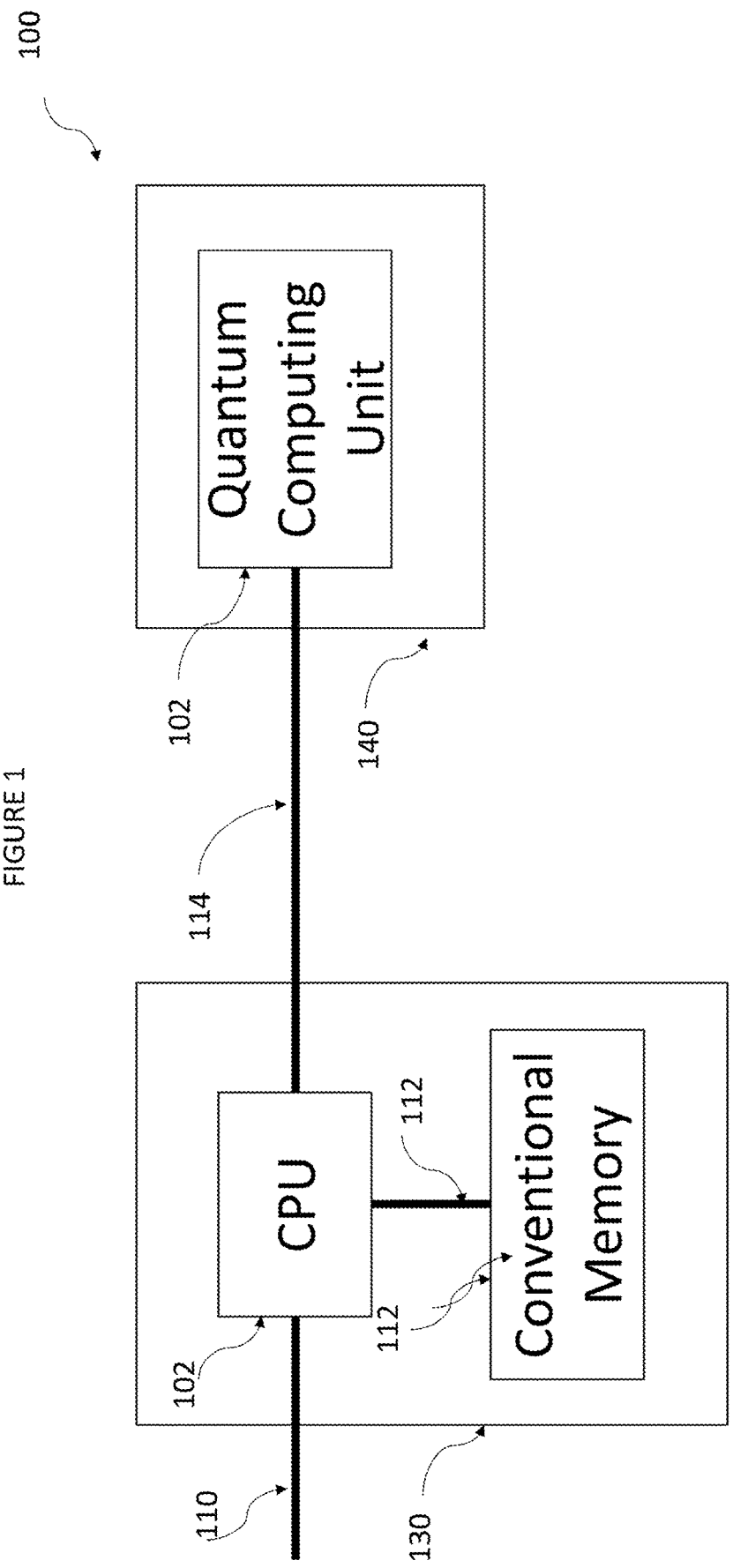
FIG. 1 is a computing system.

FIG. 1 shows a computing system 100 comprising a classical computer 130. The classical computer 130 comprises a CPU 102 coupled to provide transactions to and receive transactions from a conventional memory 104 by means of a memory interface 112. Input information may be received by the CPU from an interface 110. Output information may be provided by the CPU to the interface 110.

The classical computer 130 may further comprise additional classical computing elements as known in the art (not shown).

The classical computer 130 is coupled to a quantum computer 140. The quantum computer 140 comprises a quantum computing unit 106. The quantum computing unit 106 is configured to receive the expressions from the classical computer and resolve the problem using a plurality of qubits.

Figure 3:
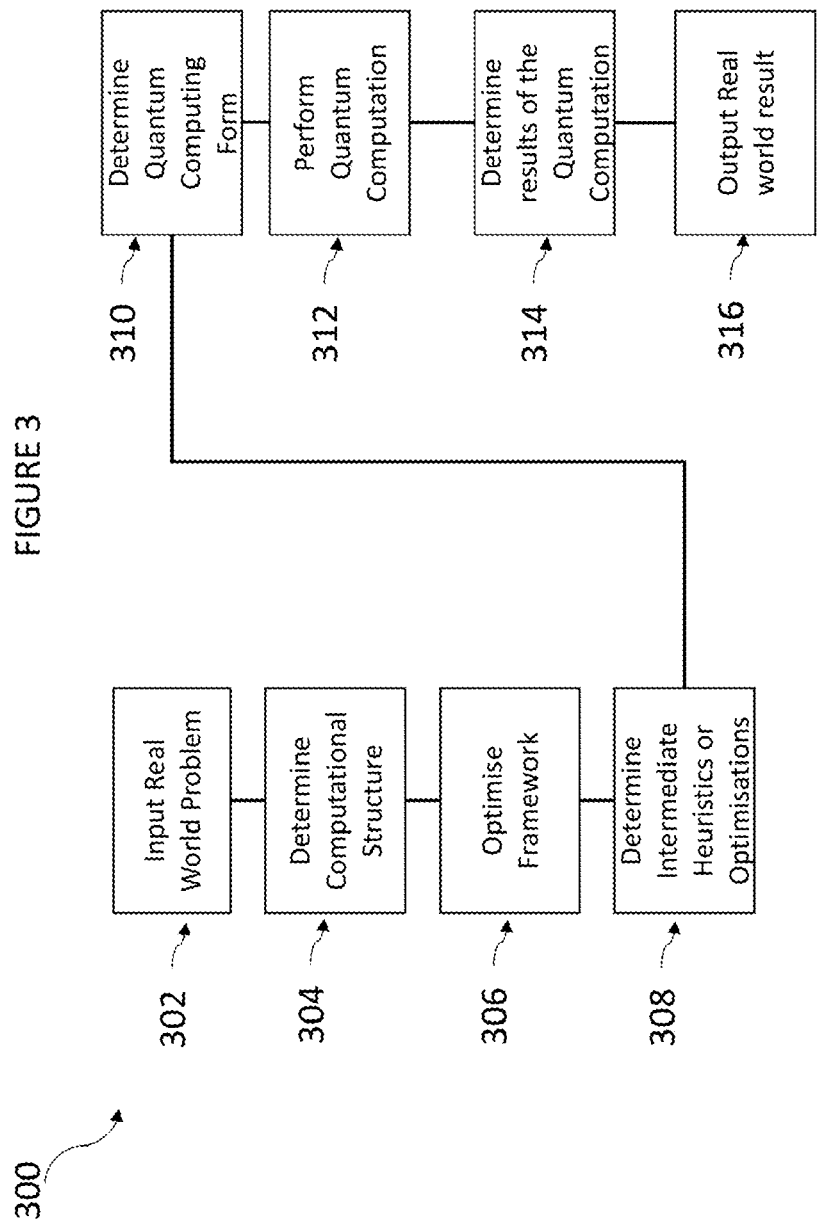
FIG. 3 is a method performed by the computing system.

FIG. 3 shows a method 300 of operation for the computing system 100. A real world problem is input 302 into the classical computer 130. The classical computer 130 determines a computational structure 304 for the problem and optimises the framework 306. Then intermediate heuristics or optimisations are determined 308. The optimisations are then passed to the quantum computer 140 to determine the quantum computing form 310. The quantum computation 312 is then performed and the results passed back to the classical computer 130 to determine the results of the quantum computation. Then the result is output to the real world 316.

Figure 4:
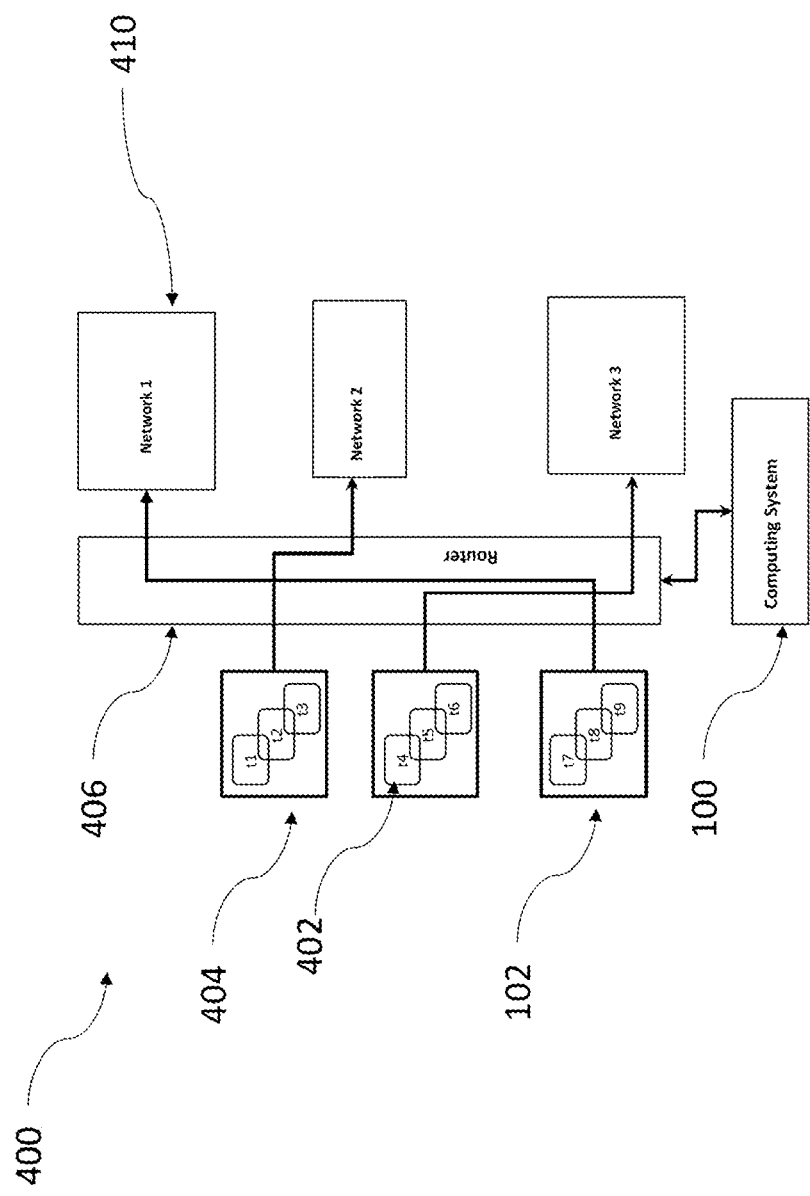
FIG. 4 is a real world problem solved by the computing system.

FIG. 4 shows a real-world switching optimisation example which may be solved by the system 100. In this example, the switching of a plurality of transactions 402 from a plurality of inputs 404 may need to be routed to a plurality of networks 410 using a router 406.

In FIG. 4 the network switching system 400 is configured to receive a plurality of transactions 402 from a plurality of inputs 404. A router 406 is configured to direct each of the plurality of transactions 402 from their respective on of a plurality of inputs to one of a plurality of networks 410. The computing system 100 is configured to determine the optimum mapping of transaction 402 to networks 410 in dependence on a plurality of requirements of the transactions 402 and characteristics of the networks.

In some embodiments each transaction may have a plurality of parameters and/or requirements associated with it which may influence the optimum network switching for the transactions. For example, associated with a transaction may be at least one of, but not limited to: a priority value, a latency requirement, a delivery deadline, a preferred delivery cost, a network preference, network protocol requirements.

In some embodiments each network may have a plurality of characteristics associated with it which may influence the optimum network switching for the transactions. For example, associated with the network may be at least one of, but not limited to: a capacity indication, a latency indication, available delivery connections, network usage costs, a supported network protocols, preference of transaction types, connected outputs.

The computing system 100 may receive the transaction requirement for the plurality of transactions and the network characteristics for the plurality of networks. The classical computer 130 may extract the characteristics and requirements and reformulate them into at least one expression for the quantum computer. The quantum computer 140 may then resolve the at least one expression to find the optimum switching paths for each of the plurality of transactions 402 across the plurality of networks 410. This optimum switching is then provided by the computing system 100 to the router 406. The switching of the transaction 402 to the networks 410 is then performed.

In some embodiments, the characteristics of the networks 410 are fixed prior to the switching of transactions 402. In such embodiments, aspects of the expression relating to the network characteristics may be determined and input to the quantum computer system 130 before the transaction requirements are received.

In some embodiments, the plurality of networks may be a plurality of payment networks configured to transmit payment requests from a payment requestor and authorisation messages from a payment holder. The payment networks may be credit card networks or automated clearing house networks. In some embodiments the transaction messages may be in one or more standard format.

The different networks may each have different usage costs which will be charged to the payment requestor for using the network. There may also be bulk discounts agreed for payment requestors who route a number of transactions over a threshold to a particular network. In some jurisdictions local laws may mandate transaction pricing levels for particular networks. Some networks may provide added value services or protections which increase the usage costs of that network.

The system may need to balance many conflicting priorities and requirements in order to ensure that individual transaction messages all reach their destination within the required timeframe or exceeding agreed transaction costs.

In some embodiments the optimisation may be composed of multiple components. In such embodiments a maximisation or minimisation of some revenue or cost may be subject to a number of constraints (for example but not limited to restrictions on networks, allocations or the overall time required for the processing. In some embodiments a weighting value may used to balance relative importance of the various constraints.

Figure 2:
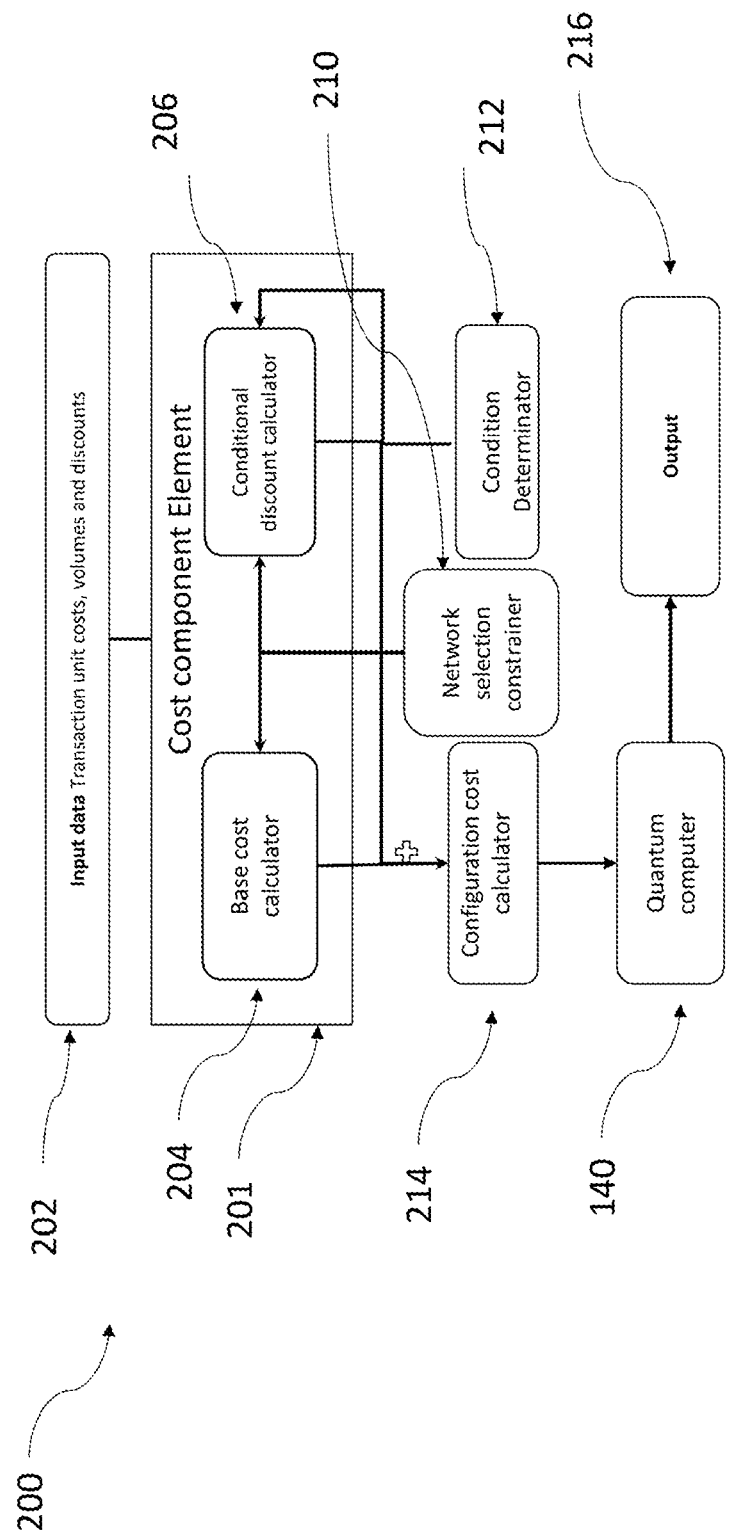
FIG. 2 is a method for formulating expressions for a quantum computer.

FIG. 2 shows a system 200 for the formulation of the expressions for a quantum computer. In this embodiment, only the cost characteristics and requirements are considered. This means that the at least one expression is directed to the cost element of the transaction switching. The system 200 receives input information 202 comprising transaction unit cots, expected volumes from different recipients and network discounts. The system 200 processes the input information to extract variables and input them into a cost component element 201 comprising base cost calculator 204 and a conditional discount calculator 206. The base cost calculator 204 and the conditional discount calculator 206 receive network constraint information from a network selection constrainer 210. The conditional discount calculator 206 receives conditional information from a condition determinator 212. The base cost calculator 204 and the conditional discount calculator 206 output a base cost and conditional discount to a configuration cost calculator 214. The configuration cost calculator 214 combines the base cost and conditional discount and provides them to the quantum computer 140 which determines the optimum values for minimising the of transmitting the transactions. The optimum values are then provided as an output 216.

In some embodiments, the discount calculated by the conditional discount calculator 206 may be conditioned to the number of transactions that are switch through a certain network. In some embodiments this may be a dynamic process dependant on the allocation which is decided by the process.

In some embodiments a number of networks (indexed by k) may offer the processing of payment transactions. The transactions may each have been assigned a type (indicated by s) based prior to being received by the system. In some embodiments a network may determine an amount to be charged based on the transaction type. The volume of transactions passing through a network may determine the application of a discount.

In order to determine optimal switching configuration that minimises the overall cost of the transaction processing the problem may be formulated in terms of a Quadratic unconstrained binary optimization (QUBO) framework.

The QUBO framework may express a real world problem as an energy function which can be provided to the quantum computer. The variables identified in relation to the real world problem are mapped to the variables of the QUBO energy function. The QUBO energy function may be thought of as a matrix wherein each value in the matrix forms expresses the relationship between two different qubits in the quantum computer. For simplicity some embodiments herein may be described in terms of a problem expressed in a two-dimensional QUBO energy function. However, other embodiments may express problems in terms of three or more dimensions. Once the energy function has been input to the quantum computer, the physical properties of the quantum computer will cause the function to resolve to a minimum value landscape which may be output as an optimisation of the result.

QUBO is a mathematical formulation for combinatorial optimisation problems. QUBO is directly related to the physical model behind quantum annealers, so by expressing a problem in terms of QUBO the quantum dynamics may be exploited to optimise a process. Some embodiments may provide a custom modelling of the QUBO energy landscape that minimises a cost function proportional to the monetary cost of the transactions switching. In some embodiments, this structure may also comprise the discount conditioned to the volume routed through each network.

In some embodiments, the cost function may comprise at least two parts. The first part is the base cost L(X) and the second is the conditional discount $f_k$.

The base cost, as determined by the base cost calculator 204, may be a function of a total cost of the transaction being routed by a configuration $(x_{\{s,k\}})$; the transaction and its type; the cost of a transaction across a network and the index of the network. The base cost may be expressed as:

$$L(X) = \sum_{s,k}[(T_s \cdot c_{s,k})x_{s,k}]$$

Where:
L(X) is the base cost
$T_s$ is the volume of transactions of type s
$c_{s,k}$ is the cost of a transaction across a network
s is the type of transaction
k is the index of the network
$x_{s,k}$ is a binary variable determining the allocation of transaction type s to network k The second component of the cost function is the conditional discount, as determined by the conditional discount calculator 206, which may be a driven by the condition $f_k$. The discount may be applied when the volume through a network is greater than a network dependent threshold. The conditional discount may be expressed as:

$$-f_k \cdot P \cdot d_k \sum_s (T_s \cdot c_{s,k})x_{s,k}$$

Where:
P is penalty determined such that the conditional discount constraints have priority over cost minimisation
$d_k$ is a discount determined based on volumes
$f_k$ is a binary slack variable
Thus, the condition $f_k$ may be expressed as:

$$\sum_s (T_s x_{s,k}) - V_k f_k \geq 0$$

Where:

$V_k$ is a discount threshold volume.

The configuration may be fixed by the network selection constraints which can force the system to choose a single network for each transaction typology. The condition $f_k$ component is a binary variable associated with each network (k).

In some embodiments the $f_k$ component associated with each network may be that is conveniently set to 0 when the volume of transactions through network k is below the threshold for obtaining the discount.

In embodiments which aim to minimise cost, the expressions are formed such that they favour the solution(s) in which the impact of the allocations and the discounts that may be received are such that an optimal minimal optimal cost is incurred. In other words, in minimal cost embodiments, a transaction may be routed via a slower or busier network or because it is cheaper.

In some embodiments, the use of quantum computing may provide a beneficial approach with the ability to explore efficiently exponentially sized spaces.

In some embodiments the use of quantum computing may provide a fast optimisation enabling allows the application of the allocation determination in real-time systems The switching optimisation outlined above is described in more detail below. Table 1 shows a set of example network costs.

TABLE 1

Example Network costs

| Transaction type | No. transactions | Network 1 | Network 2 | ... | Network n |
|---|---|---|---|---|---|
| 1 | $T_1$ | $c_{1,1}$ | $c_{1,2}$ | ... | $c_{1,n}$ |
| 2 | $T_2$ | $c_{2,1}$ | $c_{2,2}$ | ... | $c_{2,n}$ |
| 3 | $T_3$ | $c_{3,1}$ | $c_{3,2}$ | ... | $c_{3,n}$ |
| ... | ... | ... | ... | ... | ... |
| $m_m$ | $T_m$ | $c_{m,1}$ | $c_{m,2}$ | ... | $c_{m,n}$ |

As above, the first formulation of the problem may comprise finding the optimal route for bulk of transactions (which volume is $T_s$) across the available networks. The cost of a transaction type s across network k is given by the coefficient $c_{s,k}$.

For each network may also provide a discount ($d_k \in [0,1]$) dependent on the volume of transactions routed via that particular network as shown in table 2.

TABLE 2

Network discounts dependent on transaction volume thresholds.

| Network | Volume threshold | Discount |
|---|---|---|
| 1 | $V_1$ | $d_1$ |
| 2 | $V_2$ | $d_2$ |
| ... | ... | ... |
| n | $V_n$ | $d_n$ |

Thus if $Q_k$ is a set of allocations for network k, the condition for the discount is $$\sum_{s \in Q_k} T_s \geq V_k$$

and the amount is $$d_k \sum_{s \in Q_k} (T_s \cdot c_{s,k})$$

the discounted cost becomes $$(1 - d_k) \sum_{s \in Q_k} (T_s \cdot c_{s,k})$$

The allocations, consisting in the pairs of transaction type s to network k are represented through the binary matrix X having elements $x_{s,k} \in \{0,1\}$ $$X = \begin{pmatrix} x_{1,1} & \cdots & x_{1,n} \\ \cdots & \cdots & \cdots \\ x_{m,1} & \cdots & x_{m,n} \end{pmatrix}$$

The first constraint is $$\sum_{k \in [1,n]} x_{s,k} = 1$$

for all transaction types where $s \in [1,m]$. This imposes one allocation for each transaction type.

As above, the base form for the cost function is $$L(X) = \sum_{s,k} [(T_s \cdot c_{s,k}) x_{s,k}]$$

The function is linear in $x_{s,k}$ thus if we flatten X the coefficients $T_s \cdot c_{s,k}$ can be placed on the diagonal of a QUBO problem matrix and the first constraints can be encoded by using QUBO techniques.

The volume conditioned discount can be imposed by implementing the following strategy. We introduce a (binary) slack variable f and add the constraint $$\sum_s (T_s x_{s,k}) - V_k f_k \geq 0$$

for each network k. This constitutes a linear inequality in $x_{s,k}$ and $f_k$, thus it can may be implemented using QUBO techniques.

When $f_k = 0$, there is a negative impact on the energy landscape within the quantum computer. This means that it contributes to the minimisation of L(X) when the volume for the current network resides below the discount threshold whereas it has no influence when the amount is above the threshold.

As above the term:

$$-f_k \cdot P \cdot d_k \sum_s (T_s \cdot c_{s,k}) x_{s,k}$$

is also added to the cost function L(X), for each network k. The constant P is a penalty to be determined such that these constraints have priority over cost minimisation. The latter set of cost terms is quadratic in $x_{s,k}$ and $f_k$ so they may also use a QUBO model. Table 3 shows the results of the system for different volumes of transactions

TABLE 3

The results of the system for different transaction volumes

| Volume | Binary variable | Constraint | Quadratic discount applied to L | Cost minimisation |
|---|---|---|---|---|
| ≤$V_k$ | 0 | Fullfilled | No | Yes |
| ≤$V_k$ | 1 | Not fullfilled | Yes | No |
| >$V_k$ | 0 | Fullfilled | No | No |
| >$V_k$ | 1 | Fullfilled | Yes | Yes |

In this embodiment, when the volume is less than or equal to the threshold volume $V_k$ and the binary variable is set to zero the quadratic discount not is applied, the constraints are fulfilled and the cost is minimised. When the volume is less than the threshold volume $V_k$, and the binary variable is set to one, the quadratic equation is applied, the constraints are no fulfilled and the cost is not minimised. When the volume is equal to the threshold volume $V_k$, and the binary variable is set to one, the quadratic equation is applied, the constraints are fulfilled and the cot is not minimised. When the volume is greater than the threshold volume $V_k$ and the binary variable is set to zero, the constraint is fulfilled, the quadratic discount is not applied and the cost is not minimised. When the volume is greater than the threshold volume $V_k$ and the binary variable is set to one, the constraint is fulfilled, the quadratic discount is applied and the cost minimised.

In some embodiments, the penalty applied to the linear inequality constraint may be calculated such that its cost is greater than the maximum possible discount, thus the first row of the table above obtains a lower cost with respect to the second row.

Accordingly, the method 400 advantageously optimises load distribution of transactions across a plurality of networks. The skilled addressee will understand that, whilst the present method has been in relation to payment transactions, further subjects may be envisaged. For example, the method 400 may optimise the load distribution of communications through communication networks.

Figure 5:
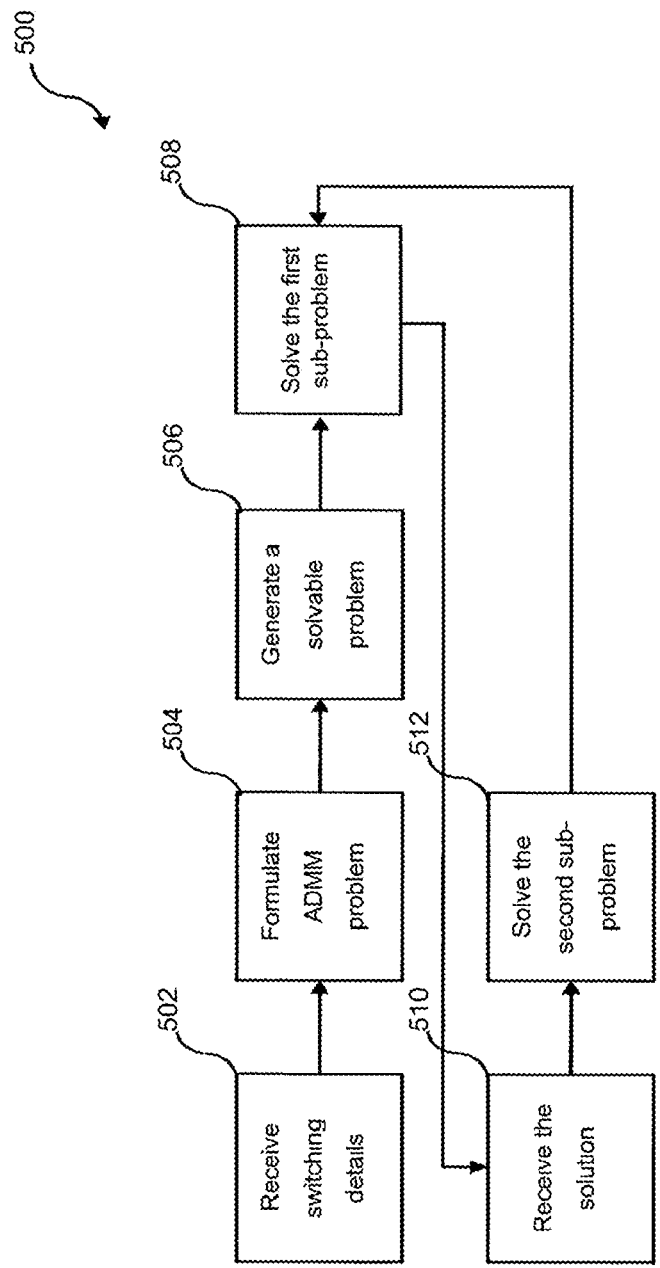
FIG. 5 is a method for solving a switching optimization problem using an alternating direction method of multipliers (ADMM) formulation.

FIG. 5 shows a method 500 for solving the switching optimization problem using an alternating direction method of multipliers (ADMM) formulation. The ADMM formulation in the switching optimization problem comprises the binary variable $f_k$, a continuous variable $x_{s,k}$, and an ancillary variable t.

The binary variable $f_k$ is a binary variable associated with each network k, indicative of a discount being activated for the respective network k. The skilled person will understand that the binary variable $f_k$ is not part of the final solution of the method 500.

The continuous variable $x_{s,k}$ is representative of a portion of a volume of transactions $T_s$ of a transaction type s to be switched to a respective network k. The continuous variable $x_{s,k}$ is limited to being between 0 and 1 inclusive, such that the continuous variable $x_{s,k}$ may be fractional. The continuous variable $x_{s,k}$ is configured to minimize the cost by maximizing the number of discounts activated. For example, if the continuous variable $x_{s,k}$ solution for a transaction type s is 0.3 for a first network $k_1$ and 0.7 for a second network $k_2$, 30% of the volume of transactions $T_s$ are switched to the first network $k_1$, whilst 70% of the volume of transactions $T_s$ are switched to the second network $k_2$. The particular transactions of transaction type s that are routed to either the first network $k_1$ or the second network $k_2$ may be selected via a random number generator. For example, a number generated for a transaction between 1 and 30 will cause the transaction to be routed to the transaction to the first network $k_1$, whilst a number generated between 31 and 100 will cause the transaction to be routed to the second network $k_2$. It will be noted by the skilled person that the volume of transactions $T_s$ is a predicted volume which may be predicted based on historic volumes of transactions $T_s$.

The ancillary variable t is a continuous variable configured to provide a mechanism for representing the switching optimization problem in such a way that it is solvable by the ADMM formulation. A value of the ancillary variable t relates to a total discount amount of all transaction types s across all volumes, such that the ancillary variable t is subject to:

$$t \in \left[0, \sum_{s,k}(T_s c_{s,k} x_{s,k})\right]$$

Wherein $T_s$ is a volume of transaction type s, $c_{s,k}$, is a cost coefficient indicative of the cost of a transaction type s for a network k, and $x_{s,k}$ is the continuous variable representative of a portion of a volume of transactions $T_s$ of a transaction type s to be switched to a respective network k.

The method 500 provides a means for minimizing a cost of routing a plurality of transactions having a plurality of transaction types through a plurality of networks each having a discount volume threshold. In particular, the method 500 minimizes the cost by determining switching a volume of transactions being routed through a first network to a second network if the second network requires a volume of transactions to meet the discount volume threshold. For example, a situation may be envisaged wherein a first volume of transactions $T_1$ is routed through a first network $k_1$, and a second volume of transactions $T_2$ is routed through a second network $k_2$. The first volume of transactions $T_s$ may be sufficient to meet the threshold volume $V_1$ of the first network $k_1$, whilst the second volume of transactions $T_2$ is not sufficient to meet the threshold volume $V_2$ of the second network $k_2$. In this case, the method 500 may act to switch the routing of a portion of the first volume of transactions $T_2$ to the second network $k_2$ in order for the threshold volume $V_2$ of the second network $k_2$. Accordingly, the discount may be activated for both the first network $k_1$ and the second network $k_2$, thereby minimizing the cost.

At a first step 502 of the method 500, switching details are received at the classical computer 130. The switching details comprise: a volume threshold $V_k$ for each network k; a corresponding discount $d_k$ for each network k; a volume of transactions $T_s$ of transaction type s; and a cost of transaction $c_{s,k}$ for the transaction type s across network k.

At step 504, the ADMM problem is formulated as:

$$\min \sum_{s,k}(T_s c_{s,k} x_{s,k}) - t - \max\{\alpha, \epsilon\}\sum_k f_k + \beta \sum_{s,k} x_{s,k}(1 - x_{s,k})$$

Wherein $\alpha$ is a trade-off parameter and P is a penalization parameter.

The trade-off parameter α is configured to maximize the number of discounts utilized by reducing a loss of the ADMM problem when a larger number of discounts are utilized. Maximizing the number of discounts utilized advantageously makes the method 500 more robust with respect to transaction volumes, the transaction volumes being predicted values. The method is more robust because the method 500 biases a uniform activation of discounts across all networks, thereby providing a maximal activation of discounts when unexpected transaction volumes are present. The skilled addressee will understand that an appropriate value for the trade-off parameter α may be determined empirically via simulation of the ADMM problem.

The penalization parameter β is configured to implement a fractionality threshold, such that a fractionality of the continuous variable $x_{s,k}$ is penalised. For example, a penalization parameter β may be selected which increases the energy of the objective optimization problem when the continuous variable $x_{s,k}$ is a fractional value. Accordingly, the fractionality of the continuous variable $x_{s,k}$ may be regulated and a threshold fractionality may be implemented. Advantageously, non-fractional results may be obtained when a router implementation of a particular network k does not allow a fractional distribution of transactions. The skilled addressee will understand that an appropriate value for the penalization parameter β may be determined empirically via simulation of the ADMM problem.

The ADMM problem is subject to a plurality of constraints, including a discount amount constraint; a discount volume constraint; a transaction allocation constraint; and a binary constraint.

The discount amount constraint ensures that the discount amount is greater than a discount amount of the ancillary variable t:

$$\sum_{s,k}(T_s c_{s,k} d_{s,k}) f_k x_{s,k} \geq t \geq 0$$

The transaction allocation constraint ensures that all transactions of each transaction type s are allocated to one or more networks k:

$$\sum_{k\in[1,n]} x_{s,k} = 1 \forall s$$

The binary constraint ensures that the binary variable $f_k$ is restricted to a 1 or a 0:

$$f_k(f_k-1)=0 \forall k$$

The skilled addressee will appreciate that further constraints may be implemented. For example, a network throughput constraint may be implemented.

In this ADMM method, the binary variable $f_k$ and the continuous variable t are alternatively solved by fixing the other variable. For example, in a first iteration of the method 500, the binary variable $f_k$ is solved while holding the continuous variable fixed and in a second iteration, the continuous variable t is solved while holding the binary variable $f_k$ fixed. By performing iterations of alternating steps of updates on subset of variables, computational complexity may be reduced when compared to other methods for solving constrained optimization problems, such as augmented Lagrangian methods.

At step 506, the classical computer 130 generates a solvable problem. The solvable problem comprises a first, non-convex, sub-problem and a second, convex constrained, sub-problem. The first sub-problem is in the QUBO form. The skilled addressee will understand that a QUBO problem may be generated according to the objective optimization problem with the associated constraints following the method provided in, for example, Glover, Fred; Kochenberger, Gary (2019). "*A Tutorial on Formulating and Using QUBO Models*".

At step 508, the quantum computer 140 solves the first (i.e. QUBO) sub-problem for the binary variable $f_k$. The solutions to the QUBO sub-problems each comprise a vector having a range of binary values, 0 or 1, corresponding to the QUBO problem. In other words, a solution to the QUBO sub-problem is a string of bits indicative of a discount being activated for a network k.

At step 510, the classical computer 130 receives the binary variable $f_k$ solution determined in step 510 from the quantum computer 140.

Finally, at step 512, the classical computer 130 solves the second sub-problem for the continuous variable $x_{s,k}$ and the ancillary variable t with a fixed binary variable $f_k$. Accordingly, this convex sub-problem is configured to be solved on a classical solver, such as Gurobi or CPlex.

Steps 508 to 512 are repeated with the continuous variable $x_{s,k}$ and the ancillary variable t from step 512 being used in step 510, until a threshold is met. The threshold may be an iteration threshold such that steps 510 and 512 are repeated until a threshold number of iterations is met. The threshold number of iterations may be, for example, 100 iterations. Accordingly, a local minimum solution of the QUBO energy landscape may be reached. Alternatively, the threshold may be a plateau threshold, wherein if a solution to the new QUBO sub-problem and/or a solution to the new convex sub-problem is the same as the respective solutions for the previous iteration of the method 500, the plateau threshold is met. Alternatively, if a difference between a current iteration solution and a previous iteration solution is less than a threshold difference, the plateau threshold is met.

Accordingly, the method 500 advantageously optimises load distribution of transactions across a plurality of networks. The skilled addressee will understand that, whilst the present method has been in relation to payment transactions, further subjects may be envisaged. For example, the method 500 may optimise the load distribution of communications through communication networks.

The description provided herein may be directed to specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the detailed description, numerous specific details are set forth to provide a thorough understanding of the disclosure provided herein. However, the disclosure provided herein may be practiced without these specific details. In some other instances, well-known methods, procedures, components, circuits, and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for allocating a plurality of transactions to a plurality of networks, the method comprising:
receiving from a router at a classical computer a plurality of first information associated with a respective one of the plurality of transactions;
receiving from the router at the classical computer a plurality of second information associated with a respective one of the plurality of networks;
determining in the classical computer a switching characteristic to be optimized by the allocation of the plurality of transactions to the plurality of networks;
expressing by the classical computer in at least one expression to a quantum computer, the plurality of first information, the plurality of second information and the switching characteristic;
providing to the quantum computer the at least one expression to determine the allocation of the plurality of transactions to the plurality of networks;
receiving from the quantum computer the allocation; and
providing the allocation to the router.

2. The method of claim 1, wherein the expressing at least one expression by the classical computer comprises:
extracting a first plurality of variables from the plurality of first information and a second plurality variables from the plurality of second information;
determining a base expression with the first and second plurality of variables;
determining a conditional expression from the first and second plurality of variables.

3. The method of claim 2, further comprising combining the base expression and the conditional expression.

4. The method of claim 2, wherein the determination of the base expression further uses a least one network constraint parameter.

5. The method of claim 2, wherein the determination of the conditional expression further uses at least one network constraint parameter.

6. The method of claim 2, wherein determination of the conditional expression uses further conditional information.

7. The method of claim 2, wherein the base expression is a base cost expression.

8. The method of claim 2 wherein the conditional expression is a conditional discount expression.

9. The method of claim 1 wherein the expressions are determined to minimize one of a transaction cost, a transaction latency and/or a network loading.

10. The method of claim 1, further comprising resolving in the quantum computer the at least one expression to determine the allocation of the plurality of transactions to the plurality of networks.

11. A system for allocating a plurality of transactions to a plurality of networks, the system comprising:
a classical computer configured to:
receive a plurality of first information associated with a respective one of the plurality of transactions;
receive a plurality of second information associated with a respective one of the plurality of networks;
determine a switching characteristic to be optimized by the allocation of the plurality of transactions to the plurality of networks; and
express in at least one expression to a quantum computer, the plurality of first information, the plurality of second information and the switching characteristic; and
a quantum computer configured to:
resolve the at least one expression to determine the allocation of the plurality of transactions to the plurality of networks;

the system being further configured to:
provide the allocation of the transactions to a router.

12. A switching optimization computer implemented method comprising the steps:
(a) determining, by a classical computer, a non-convex sub-problem and a convex sub-problem of a constrained optimization problem, the constrained optimization problem comprising:
 a binary variable indicative of a discount being activated for a respective network; and
 a continuous variable representative of a first portion of a first volume of transactions to be switched to a first network, and a second portion of the first volume of transactions to be switched to a second network;
(b) solving, by a quantum computer, the non-convex sub-problem, thereby generating a binary solution;
wherein the continuous variable is fixed for the step of solving the non-convex sub-problem;
(c) solving, by a quantum computer, the convex sub-problem, thereby generating a continuous solution;
 wherein the convex sub-problem is solved using the binary solution, said binary solution being fixed;
(d) repeating steps (b) and (c), using the continuous solution as the continuous variable, until a threshold is met; and
(e) mapping the binary solution and the continuous solution to the constrained optimization problem, thereby providing an optimized switching.

13. The method of claim 12, wherein the non-convex sub-problem is a quadratic unconstrained binary optimization (QUBO) sub-problem.

14. The method of claim 12, wherein the constrained optimization problem is solved according to an alternating direction method of multipliers (ADMM) method.

15. The method of claim 12, wherein continuous solution is determined according to a sequential convex programming method.

16. The method of claim 12, further comprising determining the constrained optimization problem based on a set of switching details, wherein the constrained optimization problem comprises a plurality of constraints.

17. The method of claim 12, wherein the plurality of constraints comprises:
a discount amount constraint;
a discount volume constraint;
a transaction allocation constraint; and
a binary constraint.

18. The method of claim 12, wherein the threshold is an iteration threshold.

19. The method of claim 12, wherein the threshold is a solution plateau threshold.

\* \* \* \* \*